United States Patent
Jones, Jr.

[15] 3,698,038
[45] Oct. 17, 1972

[54] SHELLFISH PROCESSING MACHINE
[72] Inventor: John M. Jones, Jr., Hertford, N.C.
[73] Assignee: Mrs. Elvira Cheatham Jones, Henderson, N.C.
[22] Filed: March 3, 1971
[21] Appl. No.: 120,455

[52] U.S. Cl..................................17/71, 17/48
[51] Int. Cl...........................................A22c 29/00
[58] Field of Search..................17/71, 72, 73, 54, 48

[56] References Cited
UNITED STATES PATENTS 2,683,281   7/1954   Vanns et al....................17/72
3,247,542   4/1966   Jonsson.........................17/73

*Primary Examiner*—Lucie H. Laudenslager
*Attorney*—Mason, Fenwick & Lawrence

[57] ABSTRACT

A shrimp processing machine including shrimp feeding, deheading, deveining and shell-slitting, shell-removing, and shrimp grading stations arranged along a path on several superposed levels with means to transport and properly orient shrimp from one level to another. A feed conveyor is used having troughs with a movable wall to clamp shrimp firmly during deheading, and brushes are used to eject deheaded shrimp from the conveyor. After shell-slitting and deveining, the shrimp are transferred from one level to another while being pressed into a converging throat between oppositely rotating rollers which grip and remove the shell from the meat. The processed meat is then carried along the grading station where it is removed according to size.

25 Claims, 15 Drawing Figures

INVENTOR

JOHN M. JONES, JR.

BY Mason, Fenwick & Lawrence
ATTORNEYS

INVENTOR
JOHN M. JONES, JR.

BY Mason, Fenwick & Lawrence
ATTORNEYS

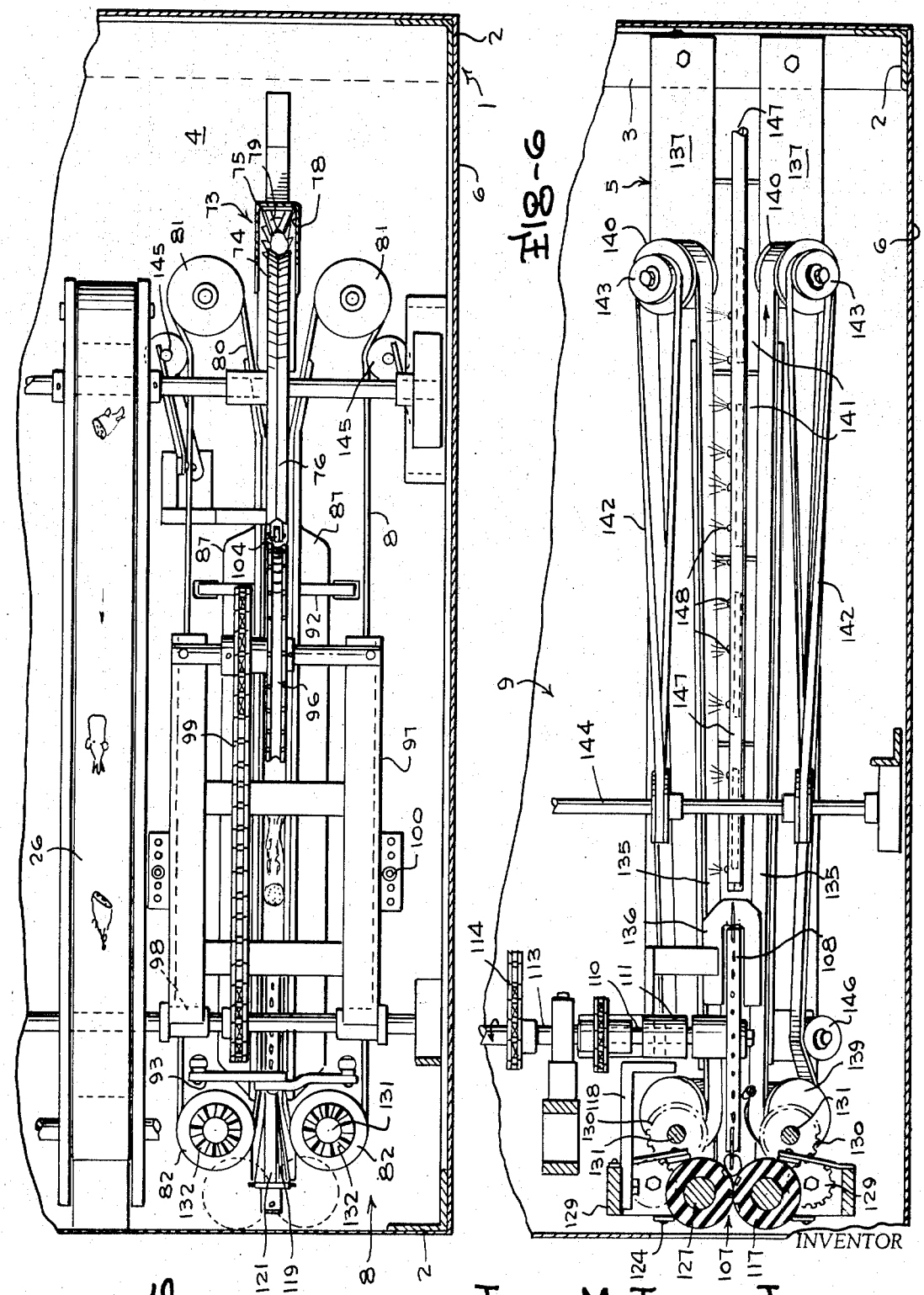

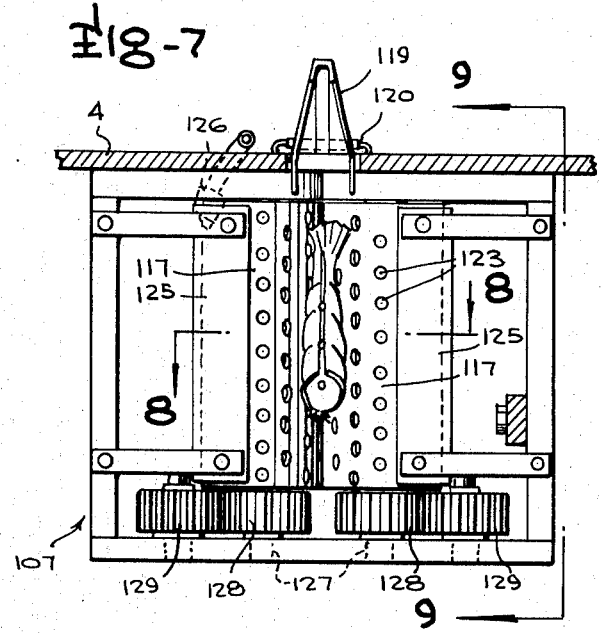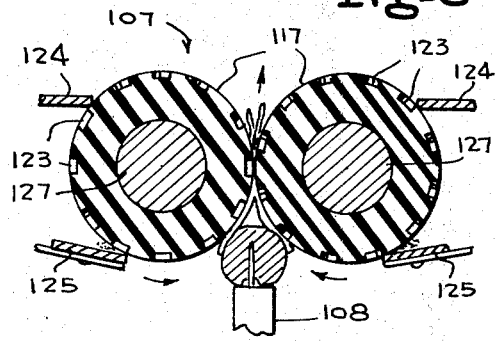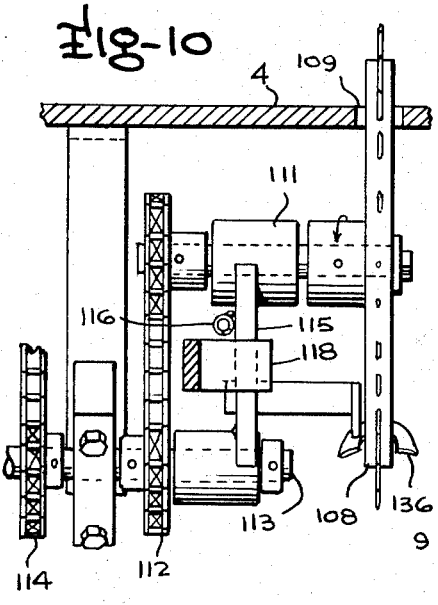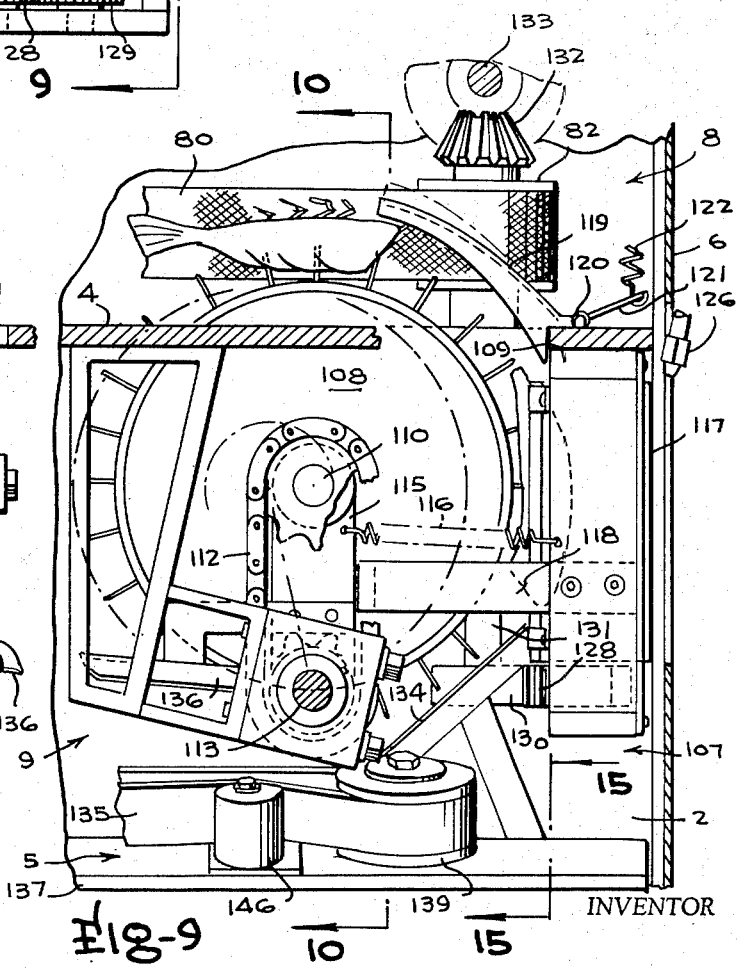

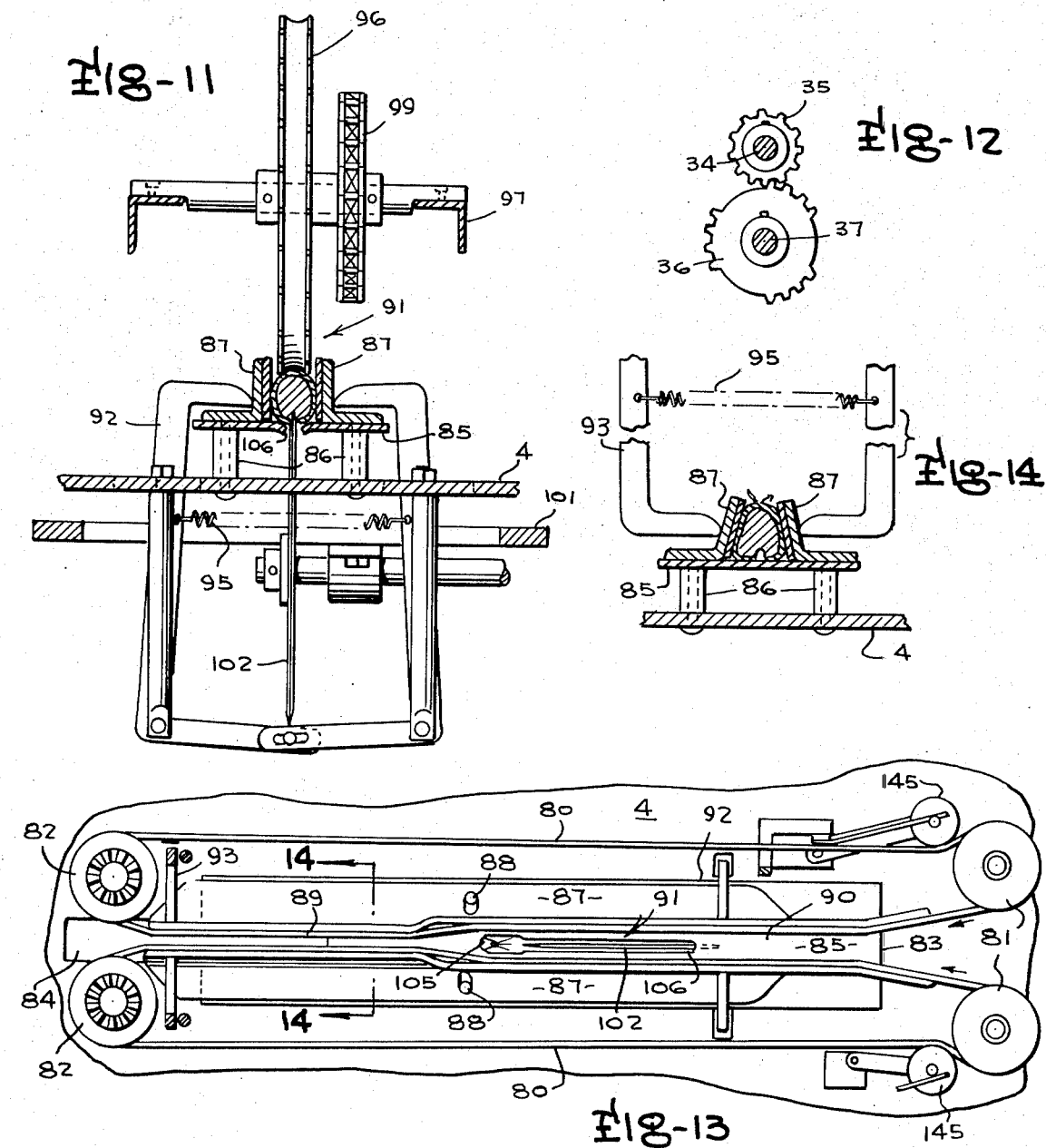

3,698,038

SHELLFISH PROCESSING MACHINE

BACKGROUND OF THE INVENTION

This invention relates to improvements in apparatus for processing shrimp, and similar shellfish, and particularly to apparatus for automatically removing the heads, veins and shells, and finally size-grading the processed shellfish in sequential steps. The apparatus is an improvement in shellfish processing machines of the type disclosed in my prior U.S. Pat. No. 3,528,125, issued Sept. 15, 1970.

In the machine of the mentioned prior patent, the shrimp, or similar shellfish, are fed in individual troughs, with the shrimp heads projecting beyond the trough ends, to a head-removing knife and then to a transfer mechanism. The troughs travel longitudinally of the machine at one level, and are transferred after head removal to a lower level where they move along a reverse direction, during which the shell is slit, the vein removed, and the shell separated from the meat. The meat, during and after the shell-separating operation, is transferred to still lower level for travel along a third path in the direction of the first, during which the meat is graded for size and deposited according to size in chutes for delivery from the machine.

The patented machine is quite practical, but its speed is not as great as might be desired. In addition, some of the specific operating mechanisms were not as efficient as could be hoped for.

SUMMARY OF THE INVENTION

The principal object of the present invention is to provide an improved shrimp processing machine which can function at relatively high speeds, and produce uniformly processed shellfish meats.

A more specific object of the invention is to provide such a machine having a transversely moving shrimp feed to the head-removing station, eliminating the orienting disk formerly required to arrange the shellfish bodies longitudinally of the path of travel after head removal.

Another object is the provision of improved troughs for the shellfish to transport them to and beyond the head-removing station.

A further object is to provide more positive means for moving the shellfish from the trough to the transfer mechanism.

It is also an object of the invention to provide improved means for removing the slit shells from the meat during transfer of the meat from the slitting and vein-removing level of the operation to the size-grading level.

Other objects of the invention will become apparent from the following description of one practical embodiment thereof when taken in conjunction with the drawings which accompany, and form part of, this specification.

BRIEF DESCRIPTION OF THE DRAWINGS

FIG. 5 is a stepped horizontal section taken on the line 5—5 of FIG. 1, showing the apparatus at the intermediate level, including the transfer mechanism from the top to intermediate levels, shrimp conveyor at the intermediate level, shrimp deveining and shell-slitting station, and the transfer mechanism from the intermediate to the bottom level;

FIG. 6 is a horizontal section taken on the line 6—6 of FIG. 1, illustrating the shell-removing station and size-grading apparatus;

FIG. 7 is a vertical section at the shell-removing station, taken on the line 7—7 of FIG. 1;

FIG. 8 is a horizontal section through the apparatus shown in FIG. 7, and is taken on the line 8—8 of FIG. 7;

FIG. 9 is a fragmentary vertical section showing the opposite side of the lower transfer wheel and shell-removing station, and is taken on the line 9—9 of FIG. 7;

FIG. 10 is a vertical section taken on the line 10—10 of FIG. 9;

FIG. 11 is a vertical section showing the conveyor path at the intermediate level, and is taken on the line 11—11 of FIG. 1;

FIG. 12 is a view of the driving gears for the trough conveyor at the top level, and is taken on the line 12—12 of FIG. 2;

FIG. 13 is a horizontal section showing in plan view the conveyor means at the intermediate level;

FIG. 14 is a vertical, transverse section taken on the line 14—14 of FIG. 13; and FIG. 15 is a vertical section taken on the line 15—15 of FIG. 9, showing the entrance end of the size-grading conveyor means.

DESCRIPTION OF THE PREFERRED EMBODIMENT

Figure 1:
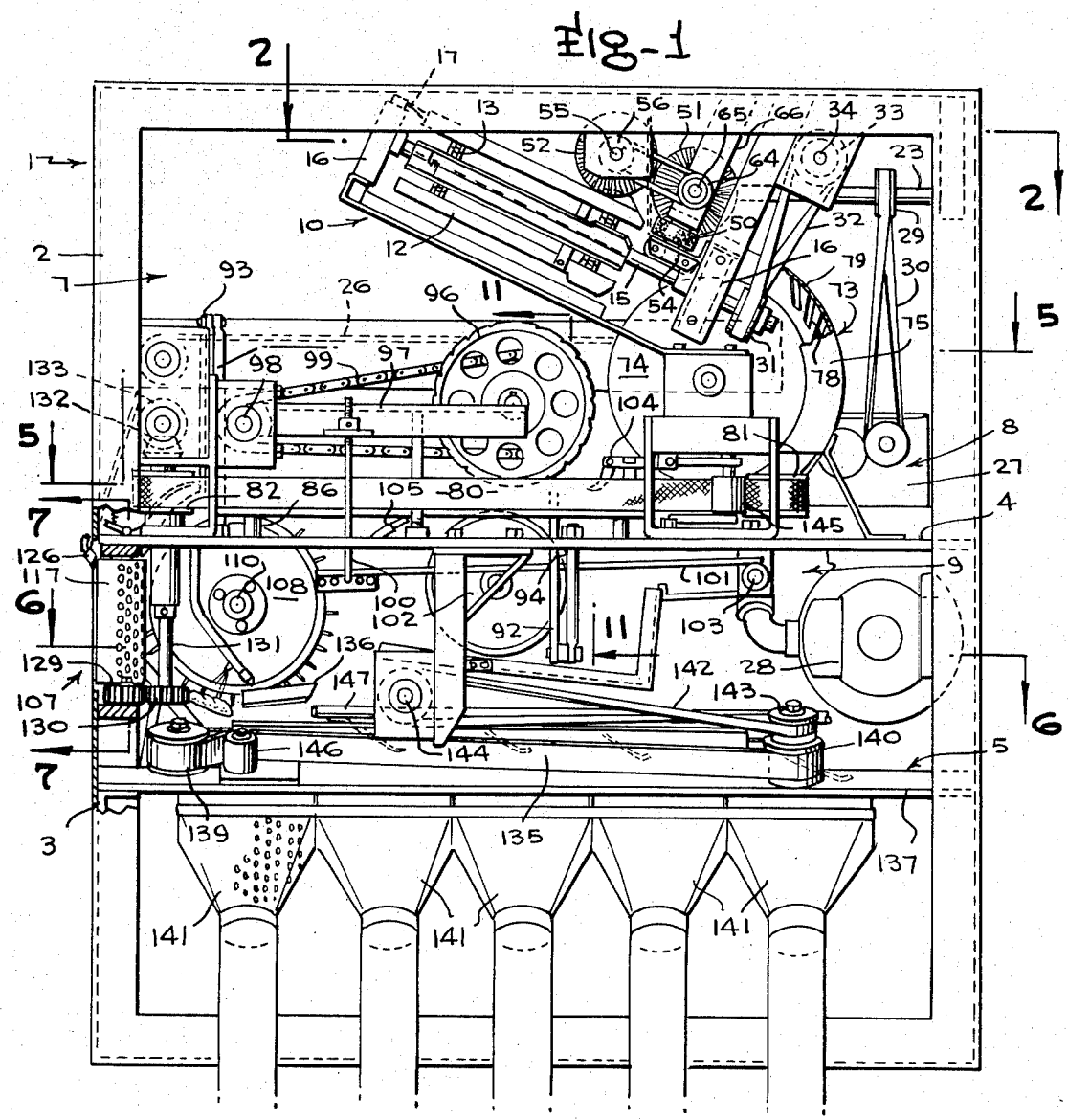
FIG. 1 is a side elevation of the improved shrimp processing machine with the side plate removed to expose interior structure, and with parts being broken in section for clarity.

Referring to the drawings in detail, the machine has a frame 1 composed of corner posts 2, connected by cross-braces 3 and supporting an intermediate shelf 4 and a bottom shelf 5. Suitable cover plates 6 close the sides, ends, top and bottom to complete a housing enclosure for the operating parts of the machine. The frame and housing details are unimportant to the present disclosure, beyond the fact that the cabinet is divided into a top operating level 7, an intermediate level 8 and a bottom level 9. Shrimp being processed are fed manually from the top and travel sequentially along the several levels until delivered from the bottom. The apparatus in the several levels will be described in the order of shrimp movement through the machine.

Figure 3:
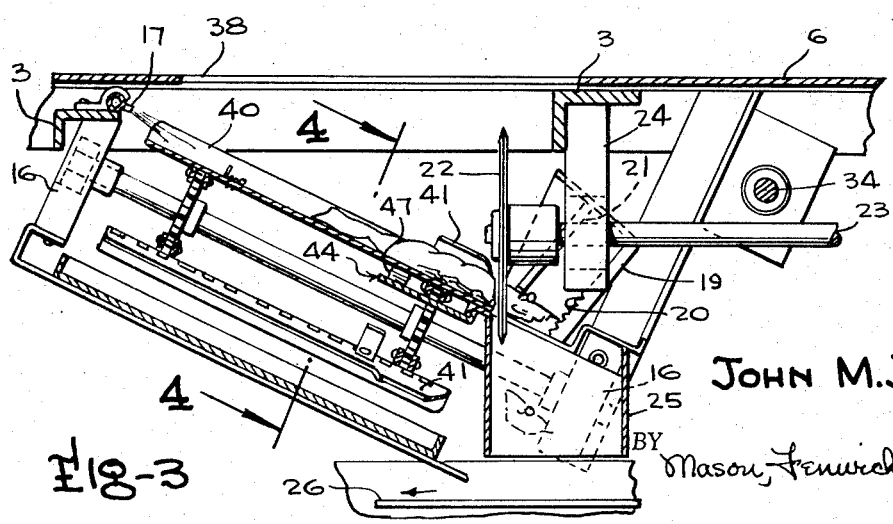
FIG. 3 is a vertical, longitudinal section at the head-removing station, and is taken on the line 3—3 of FIG. 2.
Figure 2:
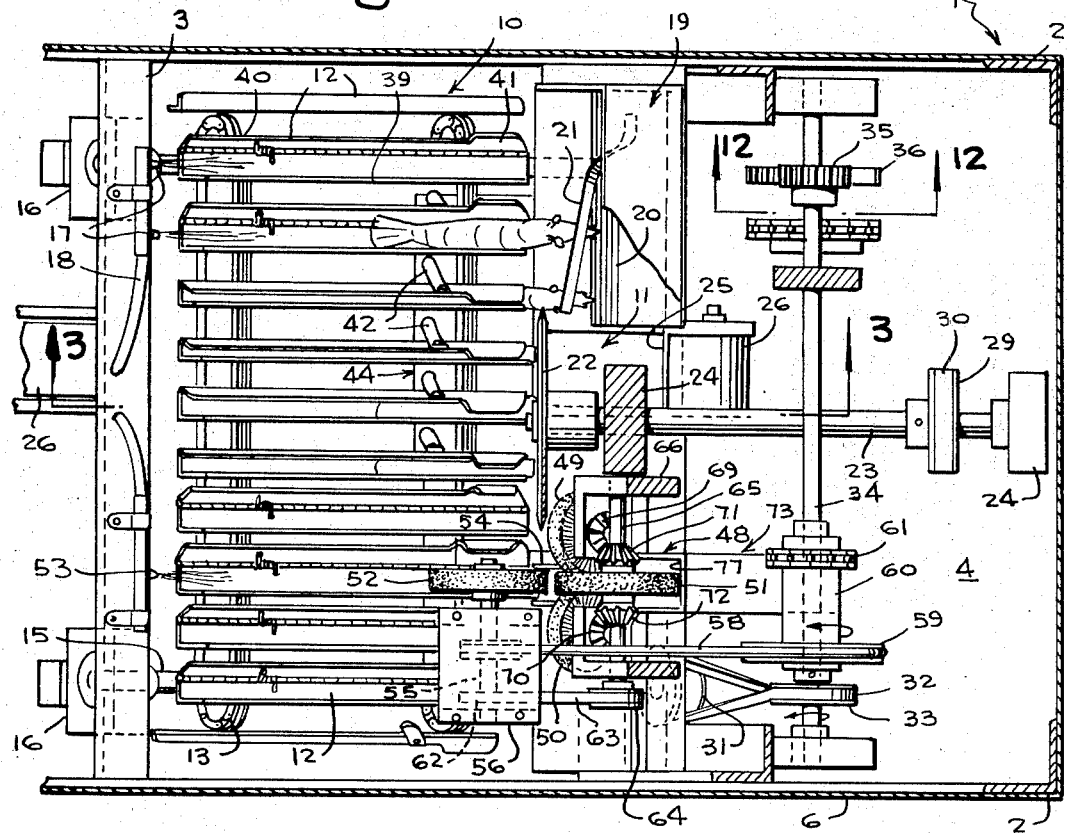
FIG. 2 is a horizontal section illustrating the mechanism on the top working level of the machine, showing the shrimp feeding, positioning, deheading and transfer means.
Figure 4:
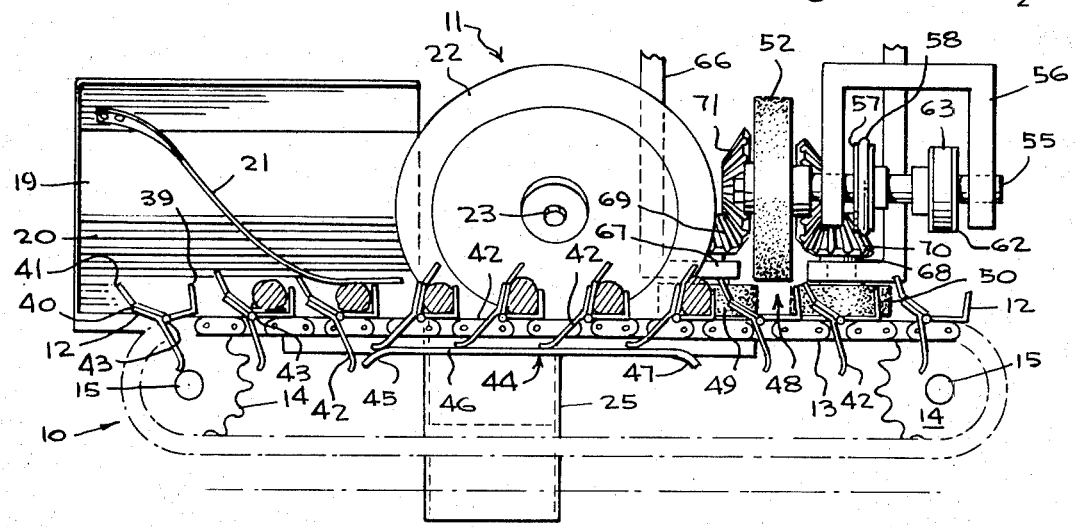
FIG. 4 is a transverse section taken on the line 4—4 of FIG. 3, further illustrating the feeding conveyor at the top level.

Referring particularly to FIGS. 1 through 4 of the drawings, it will be seen that in the top compartment, or top level, 7, there is a shrimp-feeding conveyor 10 which carries the shrimp through a head-removing station 11. The conveyor comprises a plurality of shrimp-receiving troughs 12, carried in equi-spaced, parallel relation upon a pair of conveyor chains 13 running over sprockets 14 on shafts 15. The shafts are journalled in brackets 16 supported by the machine frame. The shafts are supported at an angle to the horizontal, as shown in FIGS. 1 and 3, so that all of the troughs on the top flight of the conveyor slope downwardly toward the side of the conveyor adjacent the head-removing station 11. The downward angle of the troughs causes shrimp placed in the troughs to slide to the lower ends, with this action being assisted by water jets 17 in a supply pipe 18 positioned adjacent the high side of the conveyor troughs near the loading end of the conveyor. The jets are located in alignment with positions of rest of the troughs during intermittent feeding movement of the conveyor, as will be described.

Means are provided to accurately position the shrimp so that the entire head will be removed, irrespective of the shrimp size. The head gauge used is the same as was disclosed in the above-mentioned prior patent, and consists of an abutment plate 19 adjacent the lower edges of the conveyor troughs, inclined slightly from a right angular position relative to the plane of the troughs. The gauge is scored longitudinally to provide a vertical series of head guides 20 to receive and guide the pointed head of the shrimp as it moves to, and through, the head-removing station 11. As will be evident, the larger the shrimp, the higher on the gauge the head will make contact, therefore, the further beyond the trough lower edge the shrimp will project, due to the angular relationship of the gauge to the conveyor plane.

In order to hold the shrimp head in alignment with the body for proper severing of the head, a head depressor 21 is attached to the head gauge assembly. The depressor is in the form of a spring arm which overlies the area adjacent the trough lower ends on the approach side of the head-removing station. Due to its resiliency, the depressor will make, and hold, contact with the tops of shrimp heads of any size and urge them downwardly as they move into the head-removing station.

At the head-removing station 11, there is a deheading knife 22, mounted upon a shaft 23 journalled in bearings 24 supported by the machine frame. The knife is a disk type, positioned vertically, so that it makes an angular cut in removing the head, as is shown in FIG. 3. This removes all of the unwanted head portion, while retaining the maximum amount of edible meat. The vertical arrangement of the knife creates an upwardly diverging angle between the knife and the head gauge 19, causing greater head length to be severed from large shrimp than from small ones in desired ratio. Severed heads drop into a head chute 25 and onto a head conveyor 26, located beneath the chute for transport to a disposal point.

All of the moving parts of the machine are driven by a motor 27, and all of the water jets are supplied by a pump 28, driven by the motor. The connections from the pump to the jets will not be described, and various drives from the motor will be described only to the extent necessary to indicate a particular motion, as the connections and drives can be supplied as required in many ways by one skilled in the art. Therefore, it has been shown that the deheading knife shaft 23 carries a pulley 29 driven by a belt 30. Belt 30 is driven from motor 27, in any convenient manner, at constant speed to provide uniform, continuous operation of the knife 22.

The feeding conveyor 10 is driven intermittently to allow for placement of shrimp in the troughs and for ejection of deheaded shrimp from the trough while the troughs are at rest. To accomplish this, the conveyor shaft 15 adjacent the shrimp ejection end of the conveyor has a pulley 31 mounted on it, which is driven by a belt 32 from a pulley 33 on a drive shaft 34 carried by the frame. Shaft 34 carries a spur gear 35 (See FIGS. 2 and 12) in mesh with an interrupted tooth gear 36 on a shaft 37 below shaft 34. Shaft 37 is driven continuously from motor 27, and gear 36 causes intermittent rotation of gear 35 and intermittent advance of feed conveyor 10. The advance of the conveyor is equal to the spacing between troughs 12, so that the troughs are advanced from one trough position to the next each time the conveyor moves. This moves an empty trough to the loading position, moves a loaded trough to the head-removing station, and a trough carrying a deheaded shrimp to the ejection position each step of movement of the conveyor.

For purposes of disclosure, the machine top cover plate is shown as having a feed opening 38 located above the trailing end of the top flight of feed conveyor 10, through which shrimp may be placed by hand in the troughs, with the back up and head toward the lower end of the trough. The shrimp will tend to slide down the trough until its head contacts the gauge 19, with the head engaging the groove 20 commensurate with the shrimp size. As the conveyor moves step-by-step toward the head-removing station, the head will slide along the gauge in engagement with the proper groove, and will move under the depressor 21 to be held in alignment with the shrimp body. While the trough is at the first and second positions of pause, water jets 17 will be directed against the shrimp to assist in moving the shrimp lengthwise of the troughs into engagement with the head gauge 19.

From this point on, the shrimp head remains in contact with the gauge until the deheading knife contacts the shrimp and cuts the head from the body. As mentioned above, the head will drop through chute 25 onto the conveyor 26 and be carried from the machine.

It is quite important that each shrimp, regardless of its size, be held tightly in position as the shrimp arrives at the head-removing station. To this end, the troughs 12 have special construction to enable them to clamp the shrimp and hold it during the deheading operation. Each trough includes an angle member 39, forming the bottom and one side of the trough, which member is rigidly fixed to opposing links of the conveyor chains. The opposite side wall of the trough is formed from a strip 40, which is hinged at its lower edge to the free end of the bottom-forming portion of the angle member 39. Thus, the trough comprises a bottom with one wall rigidly attached thereto, and the opposite wall being hingedly connected to the bottom. This arrangement enables the movable wall 40 to be swung about its pivotal connection to the bottom for clamping contact with the shrimp which is seated upon the trough bottom and in contact with the fixed wall. In order to hold the shrimp against upward movement, the movable wall 40 has an overhanging wing portion 41 adjacent the trough lower end. Each movable wall 40 carries an actuating arm 42, depending below the trough. The arm is of resilient material, as it will be actuated by a fixed member, but will be required to allow the movable wall 40 to occupy different angles depending upon the size of the shrimp within the trough. Normally, the spring on the movable arm will cause the arm to swing outwardly, so that the trough is in wide open condition. This condition is shown at the left-hand end of FIG. 4 of the drawings, which is the loading end of the machine, and at the right-hand end of that same Figure, which is the ejection end. The movable side is caused to swing about its hinge connection 43 into clamping relation with the shrimp in the trough by contact of the actuating arm 42 with a fixed cam 44, located beneath the upper flight of the conveyor chain in the path of movement of the actuating arms. Cam 44 has an upwardly curving front end 45, a flat intermediate portion, which comprises the major portion of the cam length, and a downwardly curving rear end 47. As the actuating arms approach the cam during the intermittent motion of the conveyor, they will ride up the curved front end 45, swinging the hinged plates into pressure contact with the shrimp in the trough, so that the shrimp is firmly held between the fixed wall and the movable wall. The actuating arm will deflect to some extent, depending upon the size of the shrimp within the trough. In any event, it will hold the shrimp firmly pressed between the two trough walls. After the trough passes through the head-removing station, the actuating arm moves down the curved rear portion of the cam and the movable arm swings free releasing the shrimp for removal from the conveyor.

When the trough leaves the head-removing station it arrives at an ejecting station 48. The trough upon arrival is in open condition, as above described. Ejection of the shrimp from the trough is accomplished by means of two horizontal brushes 49 and 50 and a vertical brush 51. The two horizontal brushes are arranged so that their peripheries are spaced apart slightly less than the width of the trough bottom, at equal distances on opposite sides of the centerline passing through the trough at the ejection station, and the brushes have a width approximately the height of the troughs. The vertical brush has a width approximating the spacing between the horizontal brushes, and its periphery is just above the trough top. These three brushes are located adjacent the lower end of the trough. In order to start movement of the shrimp from the trough to feed it to these three brushes, a feeder brush 52 is employed. This brush is equal in size to the vertical brush 51, and it occupies a position in alignment with the brush 51 but spaced above the end of the trough in contact with shrimp in the trough. Brush 52, assisted by a water jet 53 located adjacent the upper end of the trough at the ejection station, moves the shrimp forward until it is contacted by the ejection brushes 49, 50 and 51. When the shrimp is gripped by the three ejection brushes, it is moved over a set of rollers 54 so that the shrimp will not falter as the brushes exercise their force upon it.

Feeder brush 52 is mounted upon a shaft 55, journaled in a bracket 56. A pulley 57 on shaft 55 is driven by a belt 58 which also passes around a pulley 59 on a sleeve 60 mounted for rotation on the conveyor drive shaft 34. The sleeve 60 is driven by means of a chain 61 from the motor 27. By this means, the brush 52 can be driven continuously, even though the shaft 34 on which the sleeve 60 is mounted moves in an intermittent manner. Shaft 65 carries a second pulley 62 which carries a belt 63 to a pulley 64 mounted on a shaft 65 that carries vertical ejector brush 51. This shaft is journalled in a bracket 66. Thus, brushes 51 and 52 will be rotated at the same speed and in the same direction. The horizontal brushes 49 and 50 are mounted on shafts 67 and 68, also journalled in the bracket 66. Shafts 67 and 68 carry bevel gears 69 and 70, and these gears mesh with bevel gears 71 and 72 carried by shaft 65. By proper positioning of the several bevel gears, the brushes 49 and 50 will be caused to rotate in opposite directions to propel the shrimp in an ejecting direction, with the adjacent edges of the brushes 49, 50 and 51 all moving in the same direction and at the same speed. When the deheaded shrimp is ejected from the feed conveyor, it is moved into a transfer mechanism 73. At the time of ejection from the feed conveyor, the shrimp is still in position with its back up and legs down. As the next step in the processing is the slitting of the shell and the removal of the vein, it is desirable that the position of the shrimp be reversed so that its back will be down for these operations. This reversal of position, as well as movement from the top level to the intermediate level of the machine is accomplished by the transfer mechanism 73.

The transfer mechanism consists of a transfer wheel 74 and a shield 75 which surrounds a portion of the wheel and defines an arcuate passageway around that part of the wheel. The wheel is grooved, as at 76, providing a V-shaped channel into which the underside of the shrimp may seat. The upper periphery of the wheel is closely adjacent the ejection station, so that ejected shrimp move directly into the entrance 77 of the arcuate passageway 78 within the U-shaped shield 75, between the outer wall of the shield and the periphery of the wheel. Shield 75 carries a plurality of inwardly extending spring fingers 79 (See FIGS. 1 and 5) which fingers yieldably hold the shrimp firmly seated within the groove 76 of the wheel. This construction is very similar to that used as transfer mechanism in the mentioned prior patent.

Shrimp emerge from the transfer mechanism at the intermediate level 8 in a back-down position, and between adjacent flights of a pair of conveyor belts 80 which advance the shrimp longitudinally along the intermediate level. The conveyor belts, and the mechanism located on the intermediate level are best shown in FIGS. 1, 5, 11, 13 and 14.

Belts 80 are identical, but reversed with respect to one another, and they run around pulleys 81 at the entrance end of the shrimp path along the intermediate level, and around pulleys 82 at the discharge end of that path. Both sets of pulleys 81 and 82 are spaced apart a greater distance than required for the shrimp path, and the adjacent flights of the belts converge from the pulleys 81 to form an entrance throat 83, and diverge toward the pulleys 82 to form a discharge throat 84. The adjacent flights of the belt provide a shrimp conveying passage having movable walls which grip the shrimp and carry them along from the entrance throat to the discharge throat. The shrimp ride over a platform 85 supported from posts 86 from the intermediate shelf 4. The lower edges of the belts 80 ride just above the upper surface of platform 85 so that they provide moving walls above a stationary platform. The passage defined by the adjacent flights of the belt is determined by means of a pair of floating angle members 87, which are connected to the platform 87 adjacent their centers by means of pin and slot connections 88. This manner of connection allows the angle members to move toward and from one another, and to pivot. The vertical walls of the angle members 87 form back up members for the adjacent flights of the belts 80. The vertical walls, in normal position, define a relatively angled funnel between them adjacent the discharge end of the conveyor, as shown at 89. The vertical walls are outwardly offset, to define a wider passage 90 near the entrance end and deveining and slitting station 91. The angle members are yieldingly urged toward one another by means of pivoted arms 92 near the entrance end, and arms 93 near the discharge end. The arms 92 are pivotally connected below, and the arms 93 above, the intermediate shelf 4, and urged toward one another, in contact with the vertical walls of the floating angle members 87, by means of springs 94 and 95. This arrangement permits shrimp of large size entering the conveyor to force the entrance end of the belts apart, while the discharge ends swing together. As the large shrimp moves into the angled section 89 adjacent the discharge, the entrance end is narrowed to insure gripping of the small shrimp if the next successive shrimp is a small one. If the next shrimp is large, the floating angle members can move apart to increase the spacing between both sections. This is permitted by the yielding of the springs 94 and 95 to permit separation of the biasing arms. When a large shrimp has gone through, the arms will bring the floating angle members back into position to press the adjacent flights of the belts 80 into firm contact with smaller shrimp. This mechanism is described in the mentioned former patent.

At the deveining and splitting station 91, there is a wheel 96 which serves two purposes. It holds shrimp firmly against the platform 85, and by riding over the upper surface of the shrimp, serves as a feeler to determine the size of the shrimp. Wheel 96 is mounted upon arm 97 pivotally connected to the frame at 98. The wheel is driven by a suitable chain 99. The feeler wheel arm 97 is connected by means of a link 100 to an arm 101 which carries the slitting and deveining knife 102. Arm 101 is pivoted at 103, in an opposite direction from a pivot 98 for the feeler wheel. By reason of this arrangement, wheel 96 will rest upon a shrimp moving into, and through, the deveining knife, and its position vertically above the platform 85 will determine the position of the deveining knife, and, consequently, the depth of the cut which that knife makes through the shell and into the vein cavity along the shrimp back. This mechanism also was included generally in the prior patent.

In order to hold the shrimp properly for deveining, and to prevent the shrimp from tilting upward when it passes under the hold down wheel, a spring pressed arm 104 is provided to engage the leading portion of the shrimp and prevent it from lifting. A water jet 105 is positioned below the platform at the deveining position, to provide a continuous purge to clear away vein and waste material from the slit shrimp.

As the shrimp leaves the slitting and deveining station, it moves rearwardly out of the conveyor passage provided by the belts 80 and into a transfer and deshelling station 89. As the shrimp moves from the slitting and deveining conveyor, it is still upon its back, with the legs upward, and the shell slit along the center of the back. The mechanism for transferring the shrimp to the bottom level 9 and for removing the shell in transit, is best shown in FIGS. 1, 6, 7, 8, 9, 10 and 15.

The actual transfer is made by means of a tined wheel 108. Wheel 108 projects through a slot 109 in the intermediate shelf 4, and is mounted upon a shaft 110 journaled in a bearing 111. The shaft is driven by a chain 112 from a stub shaft 113, which is driven from the motor by a chain 114. Bearing 111 is carried by an arm 115 which is pivoted upon the stub shaft 113. The arm 115 is biased by a spring 116 in a direction to urge the wheel 108 toward a pair of shell removing rolls 117 mounted vertically adjacent the periphery of the tined wheel. A stop 118 limits the rearward movement of the wheel to a predetermined maximum.

As the shrimp leave the deveining conveyor, they are urged downward by angled funnel at 89 and become impaled upon the tines of the wheel 108 and are carried rearwardly and downwardly by that wheel. In the first part of the travel, the shrimp, with its legs up and tail at the rear, passes beneath an inverted U-shaped guide 119. This guide is of increasing depth from its entrance end to its point of attachment to the frame above the shell removing rolls 117. The purpose of the guide is to urge the shrimp onto the tined wheel and to divert from the deveining conveyor and fold the tail of the shrimp together for proper entry between the shell removing rolls. This is particularly advantageous in completely removing the tail section of the shell from the shrimp. Guide 119 is pivotally attached to the frame, as at 120, and has an arm 121 extending beyond the pivot, and connected to a spring 122, which biases the shaped guide toward the periphery of the tined wheel to insure proper contact with and even pressure on shrimp of various size.

As the shrimp leave the guide 119, they move into the throat formed by the adjacent shell removing rolls 117, being pressed into surface contact with these rolls by means of the spring 116 biasing the tined wheel toward these rolls. The rolls are cylindrical, and have recesses 123, with the recesses of one roll being staggered with respect to the other so that when the rolls contact, or when a recess is adjacent a portion of the shrimp shell, there will be a solid portion of the opposite roller against which the recess bears in order that the recess may obtain a suction grip on the shell. The rollers are made of natural rubber, and it has been found that rubber of a hardness of fifty durometer operates quite well in removing the shells. As it is absolutely essential that the roller surfaces be maintained as clean and dry as possible, in order for them to secure the proper grip on the shell to separate it from the meat, the rollers are washed continuously by water jets 126 to loosen shell fragments and wash away all surface accumulations, and scraper blades 124 are mounted so as to be in scraping contact with the roller surfaces to remove any remaining debris and excess fluid. Driers, or wiping elements 125 are also mounted to bear upon the roller surfaces to remove all moisture just prior to the contact of the roller surface with the shrimp shell.

Rollers 117 are mounted on vertical shafts 127 which carry gears 128 on their bottom ends. Gears 128 mesh with idler gears 129, and these, in turn, mesh with gears 130 which are on shafts 131, which are the shafts carrying the pulleys 82 of the deveining conveyor belts at the discharge end of the deveining operation. Shafts 131 have bevel gears 132 on their top ends, and these mesh with gears on a transverse shaft 133 which is driven from the motor 27. Thus, the drive for the deveinng conveyor and the deshelling rollers is common.

By action of the pivotal motion of the supporting arm of the tined wheel the shrimp is held firmly between the throat of the rollers as it moves downward from the deveiner belts to the grading section and the relative speed in relation to the speed and diameter of the rollers in conjunction with the hardness, surface perforations, tension between the rollers and roller speed completely remove the shells from the meats.

As the now shelled shrimp reaches the bottom of its travel around the tined roller 108, it will usually fall from the tines onto a chute 134 and slide between the adjacent flights of a pair of grading conveyor belts 135. A U-shaped deflector 136 embraces the lower edge of the tined roller, however, to positively remove shelled shrimp from the tines if they do not fall off by gravity assisted by water sprays.

The bottom shelf 5 includes a pair of rails 137 which have oppositely inclined upper faces 138. Pulleys 139 at the entrance end of the grading conveyor, and pulleys 140 at the opposite end of the conveyor are mounted on these rails and carry the belts 135. Because of the incline of the faces of the rails, the belt flights are inclined from the vertical, and the adjacent flights of the two belts form a downwardly converging conveying receptacle for shrimp. Pulleys 140 are spaced apart a greater distance than pulleys 139, so that the shrimp receiving area between the adjacent flights of the belt increases in width from the entrance end to the opposite end. As the shrimp is carried along between the belts, one of which is water sprayed, a series of springs in conjunction with the increasing space between them will urge first the small shrimp to fall through, then the larger, and finally the largest. The outer end spacing of the belts is beyond the greatest dimension of shrimp to be processed. A plurality of shrimp receiving chutes 141 are mounted below the grading belts to receive, and collect, shrimp falling between the belt surfaces. Thus, shrimp of various predetermined size will be received in the respective chutes and gathered for marketing. Belts 135 may be driven by belts 142 passing around pulleys 143 mounted on the same shafts as the pulleys 140, and around pulleys on the driving shaft 144, driven by motor 27.

Both the slitting and deveining conveyor belts 80 and the grading conveyor belts 139 can be supplied with belt tighteners, shown at 145 and 146, respectively, to maintain adjacent flights of the belts tight under varying circumstances as shrimp of different size pass between them.

In view of the fact that the operation of the various parts and movement of the shrimp through the machine has been described in connection with the description of the apparatus on the various levels of the machine, it is not thought that additional discussion of the operation is necessary.

While in the above, one practical embodiment of the invention has been disclosed, it will be understood that the particular details of construction shown and described are merely by way of illustration, and the invention may take other forms within the scope of the appended claims.

I claim:

1. In a shellfish processing machine having means to dehead, slit the shell, devein, and deshell shellfish of the group including shrimp, and means to convey shellfish sequentially to the several operating means, an improved shellfish feeding means comprising, a conveyor having a plurality of shrimp-receiving troughs and arranged in spaced parallel relation thereon, the troughs being inclined to provide a high end and a low end with the low ends moving adjacent the deheading means as the conveyor moves, each trough having a movable side, a resilient actuating arm carried by the movable side, and a cam on the approach side of, and across, the deheading means in the path of movement of the actuating arms to move the arms and cause the movable trough sides to move inwardly of the trough to clamp shellfish in the troughs.

2. In a shellfish processing machine as claimed in claim 1 wherein, there is a head gauge adjacent the low ends of the troughs to serve as a stop for the heads of shellfish, the gauge being inclined relative to the angle of the troughs to allow shellfish of various sizes to project different distances beyond the trough edges.

3. In a shellfish processing machine as claimed in claim 2 wherein, there are water jets at the high ends of the trough position to sweep along the troughs and move shellfish toward the gauge.

4. In a shellfish processing machine as claimed in claim 3 wherein, there are means to move the conveyor in increments, and a shellfish ejection station beyond the deheading means in the direction of conveyor means located at the end of an increment of conveyor movement.

5. In a shellfish processing machine as claimed in claim 4 wherein, there are rotatable brushes at the ejection station to move deheaded shellfish from a trough at the ejection station, and means to rotate the brushes.

6. In a shellfish processing machine as claimed in claim 5 wherein, the conveyor moves at right angles to the path of shellfish movement through the remainder of the machine, and the troughs occupy positions parallel to the shellfish path, and the troughs when at the ejection station are in alignment with that path.

7. In a shellfish processing machine as claimed in claim 6 wherein, the brushes have their peripheries adjacent the path moving in directions from the trough toward the shellfish path.

8. In a shellfish processing machine as claimed in claim 7 wherein, the brushes include a vertical feeder brush above the trough lower end, a vertical ejector brush adjacent the feeder brush and in alignment with the trough, and horizontal ejector brushes at either side of the trough beneath the vertical feeder brush.

9. In a shellfish processing machine as claimed in claim 8 wherein, there is a water jet at the upper end of the trough at the ejection station to assist the brushes in ejecting the shellfish from the trough.

10. In a shellfish processing machine as claimed in claim 9 wherein, the deshelling means is along the shellfish path and includes a pair of oppositely rotatable contacting rollers having their line of contact in a plane including the center of the shellfish path, and means to resiliently urge shellfish toward the roller line of contact and into contact with the roller surfaces.

11. In a shellfish processing machine as claimed in claim 10 wherein, the rollers have recesses in their surfaces providing suction grip on the shellfish shells.

12. In a shellfish processing machine as claimed in claim 11 wherein, the recesses in the respective roller surfaces are staggered to prevent registry of the recesses of one roller with the recesses of the other rollers.

13. In a shellfish processing machine as claimed in claim 12 wherein, there are water jets directed toward each roller to wash the roller surface.

14. In a shellfish processing machine as claimed in claim 13 wherein, there are scrapers in contact with each roller to clean the surface.

15. In a shellfish processing machine as claimed in claim 14 wherein, there are driers in contact with each roller to dry the roller surface prior to contact with shellfish.

16. In a shellfish processing machine as claimed in claim 15 wherein, the means to urge the shellfish toward the rollers is a tined wheel to impale shellfish and transfer them from one operating level to the next, and a plane including the roller axes is normal to a radius of the tined wheel.

17. In a shellfish processing machine having means to slit the shell and devein shellfish of the group including shrimp, and means to convey shellfish sequentially to the several operating means, an improved shellfish deshelling means comprising, a path along which shellfish with slit shells are moved, a pair of rotatable contacting rollers at one side of the shellfish path and having their line of contact in a plane which includes the center of the shellfish path, means to resiliently urge shellfish toward the roller line of contact and into contact with the roller surfaces, said rollers having recesses in their surfaces providing suction grip on the shellfish shells, the recesses in the respective roller surfaces being staggered to prevent registry of the recesses of one roller with the recesses of the other roller, and scrapers in contact with each roller to clean the surface.

18. In a shellfish processing machine as claimed in claim 17 wherein, there are driers in contact with each roller to dry the roller surface prior to contact with shellfish.

19. In a shellfish processing machine as claimed in claim 18 wherein, there are water jets directed toward each roller to wash the roller surface.

20. In a shellfish processing machine as claimed in claim 19 wherein, the means to urge the shellfish toward the rollers is a tined wheel to impale shellfish and transfer them from one operating level to the next, and a plane including the roller axes is normal to a radius of the tined wheel.

21. In a shellfish processing machine as claimed in claim 20 wherein, the tined wheel is supported upon a pivoted mount, and a spring biases the pivoted mount toward the rollers.

22. In a shellfish processing machine as claimed in claim 21 wherein, there is an inverted U-shaped guide pivotally mounted over the periphery of the tined wheel adjacent the rollers, and a spring connected to the guide urging the guide toward the tined wheel.

23. In a shellfish processing machine as claimed in claim 17, the means to urge the shellfish toward the rollers comprising a tined wheel to impale shellfish and transfer them from one operating level to the next, and a plane including the roller axes is normal to a radius of the tined wheel.

24. In a shellfish processing machine as claimed in claim 23, an inverted U-shaped guide pivotally mounted over the periphery of the tined wheel adjacent the rollers, and a spring connected to the U-shaped guide urging the guide toward the tined wheel.

25. In a shellfish processing machine as claimed in claim 23, the tined wheel being supported upon a pivoted mount, and a spring biasing the pivoted mount toward the rollers.

* * * * *